(12) United States Patent
Beckley et al.

(10) Patent No.: US 10,620,784 B2
(45) Date of Patent: *Apr. 14, 2020

(54) USING SOCIAL DATA TO ASSIST EDITORS IN ADDRESSING REVIEWER FEEDBACK IN A DOCUMENT REVIEW WORKFLOW

(71) Applicant: International Business Machines Corporation, Armonk, NY (US)

(72) Inventors: Kristina Beckley, Carlisle, MA (US); Jodi Rajaniemi, Merrimack, NH (US); Erika Varga, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,141

(22) Filed: Apr. 24, 2015

(65) Prior Publication Data

US 2016/0041959 A1 Feb. 11, 2016

Related U.S. Application Data

(63) Continuation of application No. 14/456,604, filed on Aug. 11, 2014.

(51) Int. Cl.
*G06F 3/0482* (2013.01)
*G06F 16/93* (2019.01)
(Continued)

(52) U.S. Cl.
CPC ........ *G06F 3/0482* (2013.01); *G06F 3/04842* (2013.01); *G06F 16/93* (2019.01); *G06Q 30/0201* (2013.01); *G06Q 50/01* (2013.01)

(58) Field of Classification Search
None
See application file for complete search history.

(56) References Cited

U.S. PATENT DOCUMENTS

| 8,150,860 B1 | 4/2012 | Cierniak et al. |
| 2002/0059272 A1* | 5/2002 | Porter ............... G06F 16/30 |

(Continued)

OTHER PUBLICATIONS

Office Action dated Nov. 17, 2016 received in parent U.S. Appl. No. 14/456,604, 35 pages.

(Continued)

*Primary Examiner* — Alan S Miller
*Assistant Examiner* — Arif Ullah
(74) *Attorney, Agent, or Firm* — Scully, Scott, Murphy & Presser, P.C.; Robert C. Bunker

(57) ABSTRACT

Presenting a reviewer feedback of a document, one aspect, may comprise retrieving a plurality of feedback on a document, each feedback having an associated reviewer who provided the feedback. Social data associated with the reviewer of the feedback may be obtained. A plurality of characteristics associated with the feedback may be identified, at least some of the characteristics identified based on the social data. The characteristics may include at least the associated reviewer's position in an organization hierarchy, the reviewer's expertise, frequency of the feedback, impact of the feedback, and usefulness of the feedback. The plurality of feedback may be prioritized based on the plurality of characteristics, and a list of prioritized feedback may be presented via a user interface.

6 Claims, 5 Drawing Sheets

(51) Int. Cl.
*G06Q 50/00* (2012.01)
*G06Q 30/02* (2012.01)
*G06F 3/0484* (2013.01)

(56) References Cited

U.S. PATENT DOCUMENTS

| | | |
|---|---|---|
| 2006/0026502 A1 | 2/2006 | Dutta |
| 2006/0282762 A1 | 12/2006 | Diamond et al. |
| 2008/0098294 A1* | 4/2008 | Le .................... G06F 17/241 |
| | | 715/230 |
| 2009/0018845 A1* | 1/2009 | Morel .................. G06Q 30/018 |
| | | 705/317 |
| 2009/0249451 A1 | 10/2009 | Su et al. |
| 2011/0178981 A1 | 7/2011 | Bowen et al. |
| 2013/0006978 A1* | 1/2013 | Cierniak ................ H04L 67/42 |
| | | 707/728 |
| 2013/0124244 A1* | 5/2013 | Johnson ............. G06Q 10/0631 |
| | | 705/7.12 |
| 2016/0071032 A1* | 3/2016 | Hunter .................. G06Q 10/10 |
| | | 705/7.12 |

OTHER PUBLICATIONS

List of IBM Patents or Patent Applications Treated as Related, dated Apr. 24, 2015, 2 pages.
Office Action dated Jun. 1, 2017 received in parent U.S. Appl. No. 14/456,604, 38 pages.
Office Action dated Sep. 27, 2017 received in parent U.S. Appl. No. 14/456,604, 45 pages.
Office Action dated May 15, 2019 received in parent U.S. Appl. No. 14/456,604, 31 pages.

* cited by examiner

USING SOCIAL DATA TO ASSIST EDITORS IN ADDRESSING REVIEWER FEEDBACK IN A DOCUMENT REVIEW WORKFLOW

FIELD

The present application relates generally to computers, and computer applications, and more particularly to online document processing and online document editing.

BACKGROUND

Users may share work in the form of a "document", a self-contained file for the work. Reviewing a document is often time consuming. Feedback may be received from multiple people and as a result may overlap or become redundant. Further, feedback may be considered more important depending on who provided it and their experience with the subject matter. Time is often limited and assessing the order in which to review the feedback (e.g., from most important to less important) becomes a task in itself. Because time and resources are limited, one may prioritize feedback based on various factors to help create a clearer path to update the document.

BRIEF SUMMARY

A method of presenting a reviewer feedback of a document, in one aspect, may comprise retrieving a plurality of feedback on a document. Each feedback may be associated with a reviewer who provided the feedback. For one or more of the plurality of feedback, the method may also comprise obtaining social data associated with the reviewer of the feedback, identifying a plurality of characteristics associated with the feedback, at least some of the characteristics identified based on the social data, the characteristics comprising at least the associated reviewer's position in an organization hierarchy, the reviewer's expertise, frequency of the feedback, impact of the feedback, and usefulness of the feedback. The method may also comprise prioritizing the plurality of feedback based on the plurality of characteristics. The method may also comprise presenting a list of prioritized feedback based on the prioritizing.

A system for presenting a reviewer feedback of a document, in one aspect, may comprise a processor and a storage device storing a plurality of feedback on a document. The processor may be operable to retrieve the plurality of feedback on a document, each feedback having an associated reviewer who provided the feedback. For one or more of the plurality of feedback, the processor may be further operable to obtain social data associated with the reviewer of the feedback, and identify a plurality of characteristics associated with the feedback, at least some of the characteristics identified based on the social data, the characteristics comprising at least the associated reviewer's position in an organization hierarchy, the reviewer's expertise, frequency of the feedback, impact of the feedback, and usefulness of the feedback. The processor may be further operable to prioritize the plurality of feedback based on the plurality of characteristics. The processor may be further operable to present via a user interface, a list of prioritized feedback based on the prioritizing.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIGS. 2-4 illustrate a use case scenario of a methodology of the present disclosure in one embodiment.

DETAILED DESCRIPTION

Figure 1:
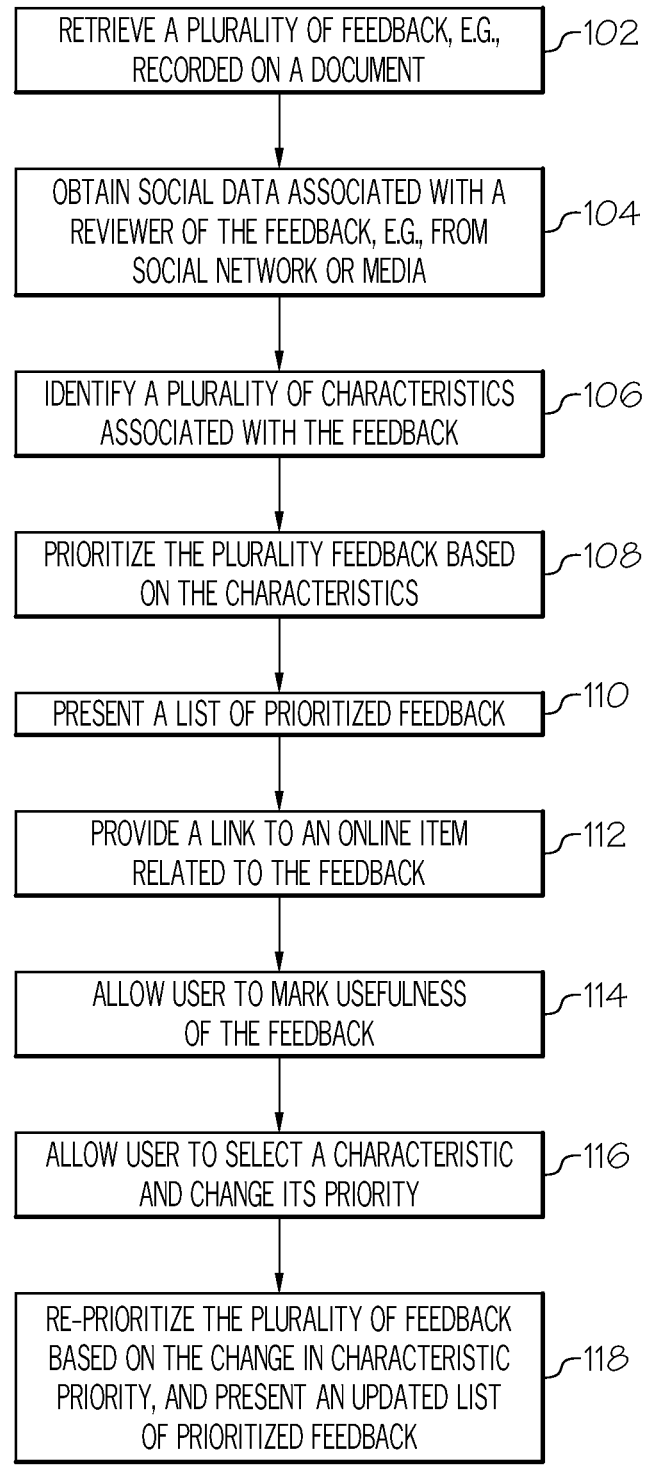
FIG. 1 is a flow diagram illustrating a method of the present disclosure in one embodiment. The method uses social data to assist editors in addressing reviewer feedback in a document.

A methodology is presented in one embodiment of the present disclosure that may alleviate the time and effort it takes an author to assess feedback during a document review workflow. In one embodiment, the methodology of the present disclosure organizes reviewer feedback based on feedback characteristics, reviewer characteristics, author objectives, and social information.

The methodology of the present disclosure in one embodiment may provide the following advantages. For example, unlike other document review workflows where the focus is on the reviewer commenting on the document, the methodology of the present disclosure in one embodiment may focus on making the update process easier for an author (or another editor of the document who is editing or viewing the document according to the feedback in the review) after the document is reviewed. The author sees a prioritized list of changes based on one or more factors which help the author or editor make the most important changes first, such as changes to concepts and ideas, and less important changes, like changes to grammar and spelling. As another example, valuable information from the author's social network influences how the author addresses feedback and is leveraged after reviewers make their comments. The document author is able to respond more intelligently by leveraging information from experts from related work.

The methodology of the present disclosure in one embodiment may provide a prioritized view of feedback from people who reviewed the author's file, for example, the list is prioritized by: reviewer expertise and involvement in similar projects, reviewer seniority or level in the organization, frequency of feedback about the same part of the file, and impact that responding to the feedback has on the file. The methodology of the present disclosure in one embodiment may also modify the list of feedback based on the author's objectives and persist those preferences across documents. The methodology of the present disclosure in one embodiment may further leverage social network to suggest work that the author can use to address reviewer feedback.

The methodology in one embodiment of the present disclosure may leverage one or more or all of the following characteristics or criteria across documents and within a single document to weight comments to form the prioritized list for the author: Reviewer expertise and involvement in similar or related work, e.g., what topics and content has the reviewer worked on in the past that is related to the review; Reviewer seniority or hierarchy in the organization, for example, vice president (VP) positions may be at a higher level of organizational hierarchy than user experience (UX) designers; Frequency of feedback, e.g., how many different reviewers commented on a section of the document, e.g., do all n number of reviewers comment on a piece of the document or just one reviewer; Impact of the feedback, e.g., how does the feedback change the nature of the deliverable, how much effort does it take to consider the proposed changes or feedback; Usefulness of the feedback, e.g., whether the author finds the feedback useful, whether the author can improve the quality of their document based on the feedback.

One or more of the above characteristics or criteria may persist across documents. One or more of the characteristics or criteria may persist within a single document. For example, in one embodiment, reviewer expertise and seniority and the usefulness of their feedback persist across documents, while frequency and impact of particular feedback lives within a single document and does not persist past the review of a single document.

FIG. 1 is a flow diagram illustrating a method of the present disclosure in one embodiment. The method uses social data to assist editors in addressing reviewer feedback in a document. An author of a document creates or edits a document. A reviewer, e.g., may open a word processor or a like computer-implemented tool to review the document. The word processor or the like computer-implemented tool may incorporate the above-described techniques to allow a user to view a prioritized list of feedbacks and update the document based on the feedbacks. Thus, for example, the technique of the present disclosure in one embodiment may be incorporated with word processor technology or technique.

Responsive to a reviewer entering a comment or feedback on the document, the word processor or the like computer-implemented tool records the document feedback. The recorded feedback may include the content of the comment or feedback and the reviewer's identity. The reviewer's identity may be set as a user who opened the document to review, e.g., as identified by the word processor's registered user. In one embodiment, the reviewer is at least registered with the social network where the document lives or is related to.

A method of the present disclosure in one embodiment retrieves the recorded feedback on the document and ranks or prioritizes the feedback based on a plurality of characteristics or factors derived from social data. At 102, a plurality of feedback on a document is retrieved.

At 104, social data is obtained from different places such as social networks, analytic tools that track user behavior while working in the word processor, and databases. For example, an online word processor that has the capability to connect to a social network may be utilized. For instance, a word processor software or like computer-implemented tool may be connected to a social network via an application interface program (API) or another such program that allows applications (e.g., word processor and social network application) to connect and communicate data. Social data may be fed into the word processor using APIs. Social data may include user profile, data from social network, data from a blog, a corpus of information from the Internet or World Wide Web, news feeds, a bibliography, an organizational hierarchy, expertise, for example obtained using search engine and data mining and analysis techniques. A social network profile is an example of social data. Content, such as files, wikis, blogs, are other examples of social data. Social data may be also gathered using search engines and natural language processing. The author's unique identity is determined based on the social data and information the word processor captures about the author. For example, the author may be required to login to or register with the social network before being able to use the word processor. As another example, a link may have been previously created between the user and the word processor from the user's previous interaction with the word processor. The relationship between the author and reviewer may be established by searching and analyzing the social data. Knowing who the author is in relationship to the reviewers helps prioritize the feedback based on organizational structure. For example, an entry level person is more likely to listen to a person in supervisory level or managerial level.

The reviewers' unique identities are determined from the list of feedback and social data, for example, in similar manner to determining the author's unique identity. For each feedback, social data associated with the reviewer of the feedback may be obtained, e.g., by obtained from social network, searching, and others.

At 106, characteristics associated with the feedback on the document are identified or determined from information derived from the social data for an author of the document, reviewers of the document, and the content of the reviewer feedback. For example, for each feedback, at least some of the characteristics associated with the feedback are identified from the social data.

At 108, the list of feedback is prioritized based on the relationship between the characteristics or factors, e.g.: what is known about the author and reviewers via the social data that was collected (reviewer expertise and involvement in similar work and reviewer seniority in the organization), impact to the document, frequency of a particular type of feedback, and how useful the author rated feedback from the same reviewers in previous review sessions. Another example of a characteristic of a feedback may be how the reviewer that provided the feedback is related hierarchically in an organization with the author of the document, for example, relative relationship in an organization hierarchy between the author of the feedback and the author of the document.

Knowledge about the author and reviewers may be determined from the social data that was collected, e.g., using data analytics techniques to discover the reviewer's expertise and position in an organization. For example, expertise may be determined using existing methods that measure contributions (e.g., Uploads, Comments, Posts, etc), social interactions (e.g., Likes, Comments, Views), networking (e.g., # friends). Position in the organization may be also determined using existing methods for storing organizational relationships between people. Organizations store those relationships between people in a database connected to the social network. The database stores information such as job role, title, position, connections to others. Knowledge about the author and reviewers may also be determined by hooking into existing social data (expertise apps and organizational charts) and content from the social networks and the web.

Impact to the document may be determined. For example, using existing natural language processing and word processing features such a dictionary and grammar-based rules, the methodology of the present disclosure in one embodiment can measure the impact the feedback will have on the author's document by assessing whether the reviewer's feedback is about concepts or grammar/language. The methodology of the present disclosure in one embodiment may look for words and/or phrases in the feedback that indicate whether the feedback is about spelling and/or grammar or whether the feedback is about a concept or idea. The methodology of the present disclosure in one embodiment may use natural language processing to look for other terms too, like "minor" or "major" change, "fatally flawed", and other common words and/or phrases used to describe someone's feedback. Once the nature of the feedback is determined, the methodology of the present disclosure in one embodiment may then compare the nature of the feedback to how much of the document has to be changed or updated. The methodology of the present disclosure in one embodiment may compare the nature of the feedback to the frequency that it appears in the document and the length of the document that the feedback refers to. For example, feedback on a particular concept that needs to be changed in multiple places in the document will take more effort to update, then a single feedback on a spelling error.

Frequency of a particular type of feedback refers to a number of feedback or comments that is provided for the same section of the document or the entire document. The word processor software or the like computer-implemented tool that implements a methodology of the present disclosure may maintain a number of feedbacks that are made on a particular section of a document or the entire document.

The author rated usefulness of the feedback may be determined by allowing the author to enter whether the author found the feedback useful or not, and/or a level of usefulness, e.g., as a normalized value (e.g., range of 1-10 or another). For example, the word processor or the like computer-implemented tool may have user interface button or link that a user may select to enter such information.

The above characteristics or factors are taken into account to prioritize the feedback. For instance, each feedback may be weighed according to the above characteristics. For example, each characteristic may have a weighted value. For example, a weighted value for a feedback characteristic of reviewer's organization position may be higher for higher positions than lower positions in an organization hierarchy. As another example, a weighted value for a feedback characteristic of reviewer's expertise level may be higher for an expert than a novice in the relevant field. Yet as another example, the weighted value of a characteristic that describes a document author and document reviewer relationship may be higher if the reviewer is higher up in organization hierarchy position than the author of the document.

The weighted values of all characteristics may be summed for a feedback. The feedback having the highest summed weighted value may be listed at the top of the prioritized list. Thus, for example, the prioritized list may contain feedbacks listed according to the decreasing summed weighted values. For example, the prioritization may be weighted by the characteristics of the feedback, the author and reviewer identities, and may be adjusted by user input.

At 110, the prioritized feedback is presented as a list in the word processor and communicates to the user what part of the document the feedback refers to, who provided the feedback, why the list is prioritized the way it is, and how the author can mark whether the feedback is useful. In one aspect, a procedural document review workflow is related to pre-determined rules for job role and organizational hierarchy. For example, feedback rank or priority may be based on the comment author's (reviewer's) position in an organization, job role, expertise and/or how the comment author (reviewer) is related hierarchically to the document author.

In another aspect, the reviewer comments may be made at specific points in a document, and refer to those specific points. Tightly coupling comments with specific points in the document provides greater context for the document author to make changes to the document based on those comments. Comment frequency and usefulness of the feedback may be based on how the comment refers to a very specific section or point in the document. For example, frequency of comments in a specific location in a document and the relative position in an organization hierarchy of a comment author and document section author may help a person viewing comments understand where to focus in the context of a review.

At 112, the list of feedback also provides a way for the user to find or see related work in the social network that helps the user (e.g., the author) address the feedback. For example, a hyperlink may be provided in the user interface (that is presenting the feedback and the document) to connect to another item that is related to the feedback. The methodology of the present disclosure in one embodiment may make recommendations for addressing feedback to help the author update his document. For example, using existing methods, the methodology of the present disclosure in one embodiment may analyze files, pages, comments, etc., on the social network to provide recommendations on related work and solutions.

At 114, the user (e.g., author) may mark whether certain feedback is useful. User's rating of whether the feedback is useful, may be used to assign a weight associated with this particular characteristic of this feedback, which may impact the next document that is reviewed by the same reviewer. For instance, the author may be allowed to rate how useful the feedback is through a rating system, e.g., 0 to 5, where 0 is not useful at all and 5 is extremely useful. Other rating methodology may be utilized that enable the author to rate the usefulness of the feedback.

In one embodiment of the present disclosure, a user interface may be provided that allows a user (e.g., author of the document) to prioritize a list of characteristics, for example, to select, modify, the priorities of the characteristics, for example, to specify which characteristics should weigh higher in prioritizing feedbacks based on those characteristics. The user interface may be part of the functionality of the same word processor software or like computer-implemented tool that allows a reviewer to provide feedbacks and also allows a user to author or edit a document. At 116, user's selection of characteristic and modification of a priority for the selected characteristic may be received. At 118, responsive to the user modifying the priorities of one or more characteristics, e.g., by utilizing the user interface and interactively selecting one or more characteristics, the presentation of the list of feedbacks may be updated. For example, the updated list may have the feedback prioritized differently based on the modification of the characteristic priorities.

Figure 2:
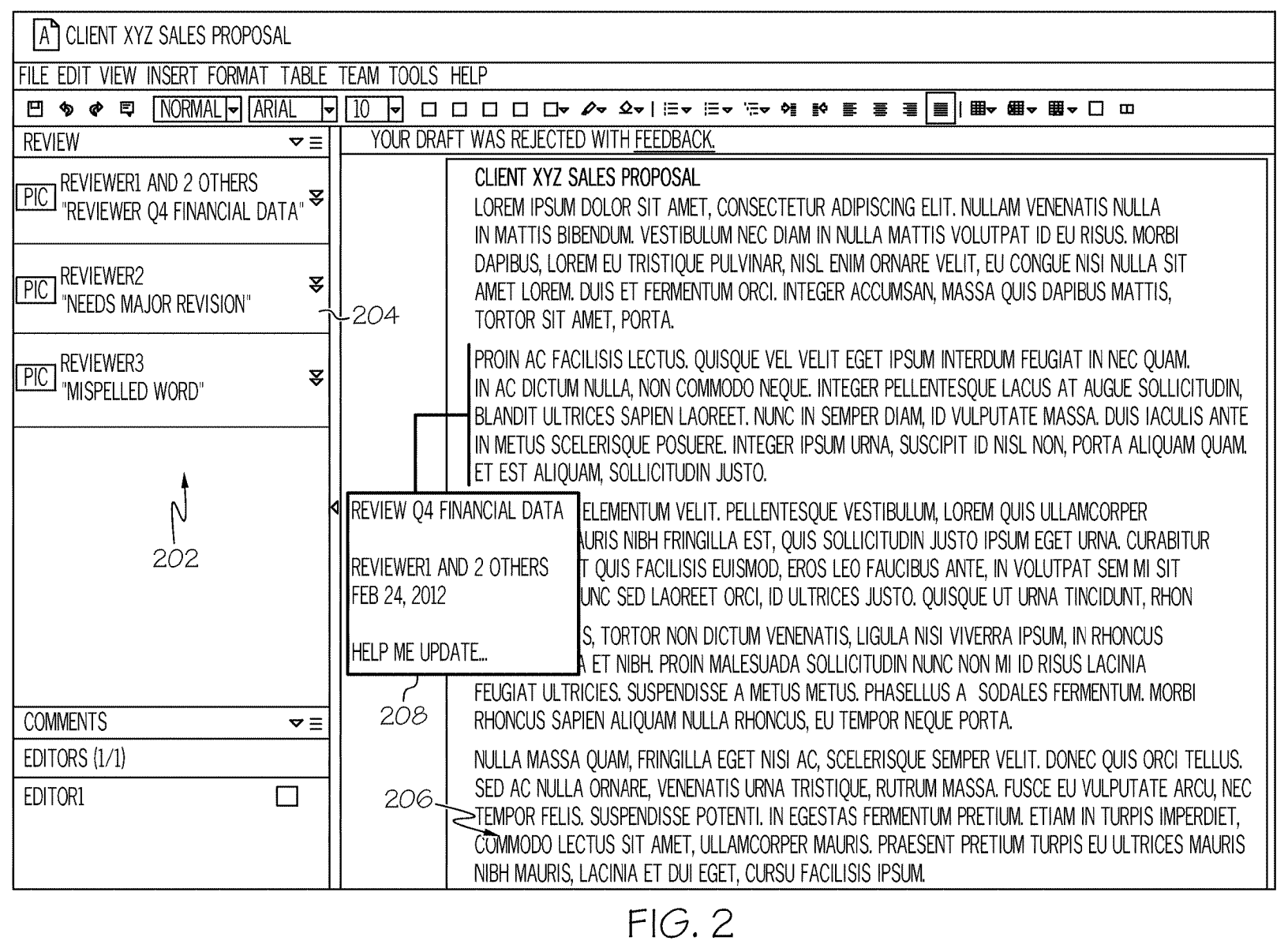
Figure 3:
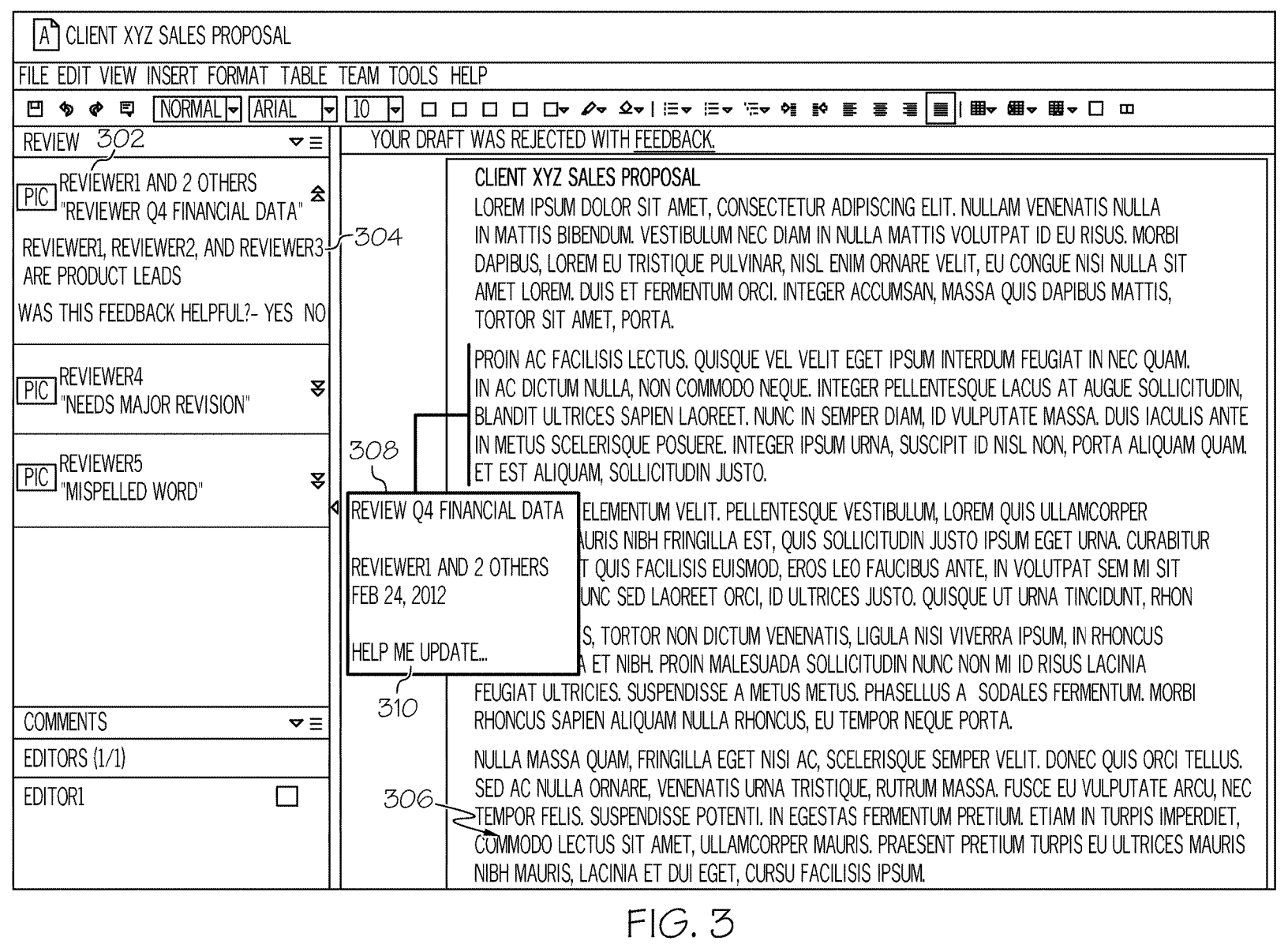
Figure 4:
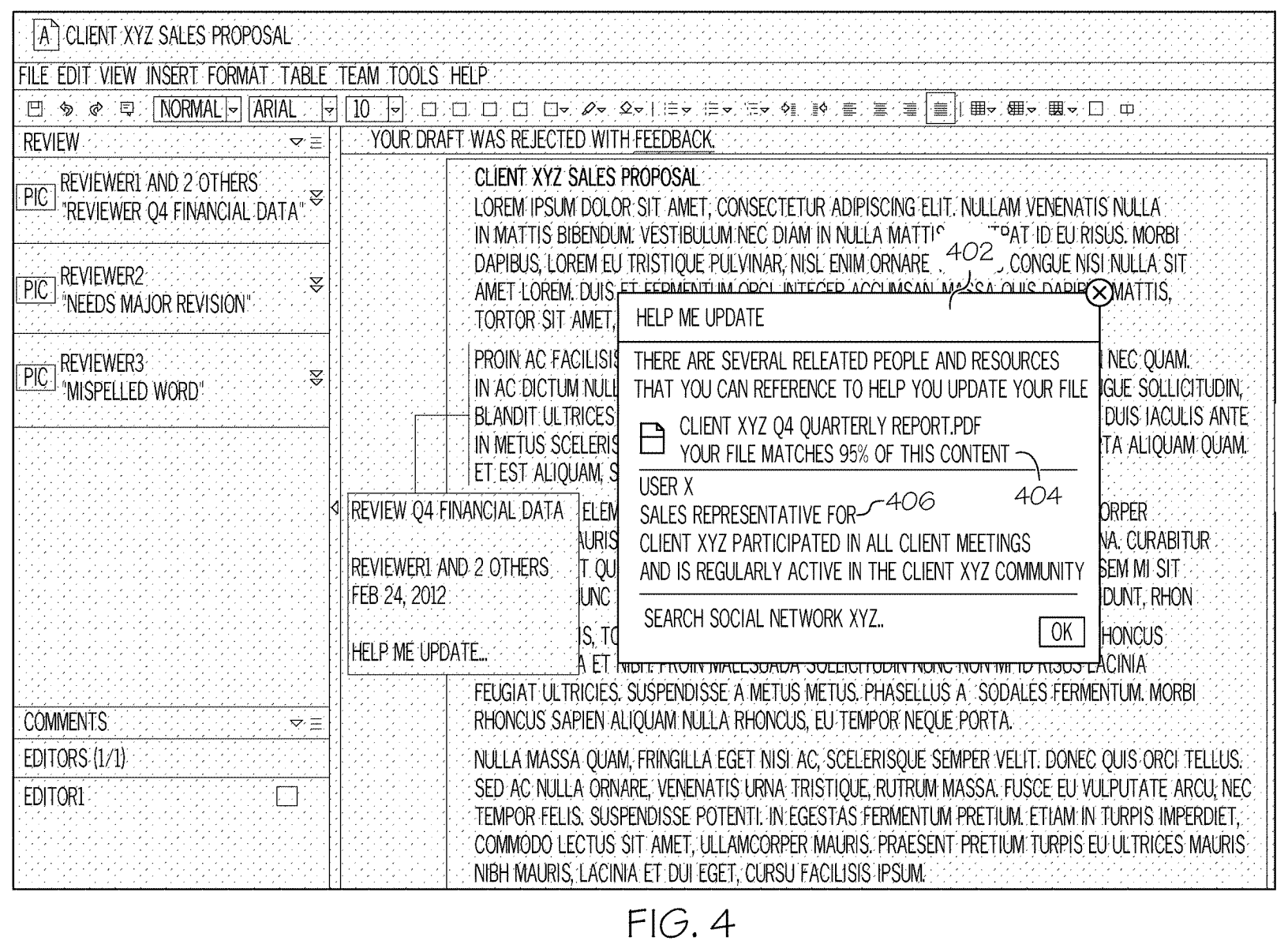

FIGS. 2-4 illustrate a use case scenario of a methodology of the present disclosure in one embodiment. The scenario describes what happens after an author's document is reviewed by one or more reviewers. An author (referred to herein as User 1) is writing a sales proposal for her company's new client, Client XYZ. After she finishes writing the first draft, she submits it for review in her Client XYZ Client Community in her social network where the managing director and several client representatives will review her draft before it is shared with the rest of the community.

The methodology of the present disclosure in one embodiment presents User 1 (e.g., the author) with a prioritized list of feedback based on reviewer seniority and expertise, impact and usefulness of feedback, and frequency of feedback. User 1 may use the prioritized list after the managing director and sales representatives review her document as shown in FIGS. 2-4.

Referring to FIG. 2, for example, User1 opens online word processing software and sees that the reviewers have finished reviewing her document and have left feedback for her. User 1 sees a prioritized list of feedback 202 based on reviewer seniority, reviewer expertise, impact of feedback, and frequency of feedback. For instance, a reviewer panel 204 may show a list of reviewers and their comments. A word processing document panel 206 shows the document that is reviewed. The document review interface may be embedded in the word processing software. Both pieces may appear as a single experience to the user. This word processing software with reviewer user experience may be useful when the word processor is part of a suite of applications typically found in a cloud or online environment, or desktop software that has network capabilities.

A window 208 is also displayed pointing to the section of the document that the reviewers reviewed and commented. The window 208 may contain a link, e.g., shown as "help me update" hypertext or an icon for providing similar functionality.

Referring to FIG. 3, User1 clicks to expand the feedback at the top 302 of the prioritized list to see why it is shown as the most important change. Information 304 is displayed describing why this is an important change, e.g., the information shows that Reviewer1 has a position of being a product lead, along with two others, Reviewer4 and Reviewer5.

If the feedback is helpful, User1 may click "Yes" and the methodology of the present disclosure system remembers that Reviewer1, Reviewer4 and Reviewer5 have provided useful feedback. Over time, as User1 has other document's reviewed, the prioritized list of feedback is influenced by User 1's reaction or response to earlier feedback (whether that earlier feedback is helpful or not). In this way, in one embodiment of the present disclosure, if a reviewer (e.g., Reviewer1, Reviewer4 and Reviewer5) do not provide valuable feedback across multiple documents, then their feedback will be prioritized lower on the list of feedback and help User1 to focus on the most valuable feedback.

User1 finds Reviewer1, Reviewer4 and Reviewer5's feedback in the body of her document 306, for example, via a window that points to a section of the document and shows who the reviewers are 308, and wants to take the next step to address the feedback. User1 may click the 'Help me update' link 310 and in response, User1 sees people and artifacts in User1's social network where this document review took place, which help User1 address the feedback.

FIG. 4 shows a window that is displayed or presented responsive to the 'Help me update' link 310 being selected. The window 402 may show a document or online material that the comment pointed to. For example, Reviewer1's comment suggested to review Q4 financial data. The 'Help Me Update' window 402 shows a link to a document or online material 404 that has the Q4 financial data. Additionally, people (e.g., shown as User X) 406 in User1's social network, who might be associated with a topic of the suggestion in the review, e.g., Q4 financial data, may be shown.

As described above, a list of feedback or comments from multiple reviewers for a document in a word processor or like computer-implemented tool may be ranked. Feedback or comments may be ranked according to criteria such as impact and usefulness of the feedback (comment and characteristics of a reviewer such as expertise, job role or position, frequency of feedback and history of similar feedback content. A user may be enabled to modify the criteria that is used to rank the feedback or comments in the document.

Figure 5:
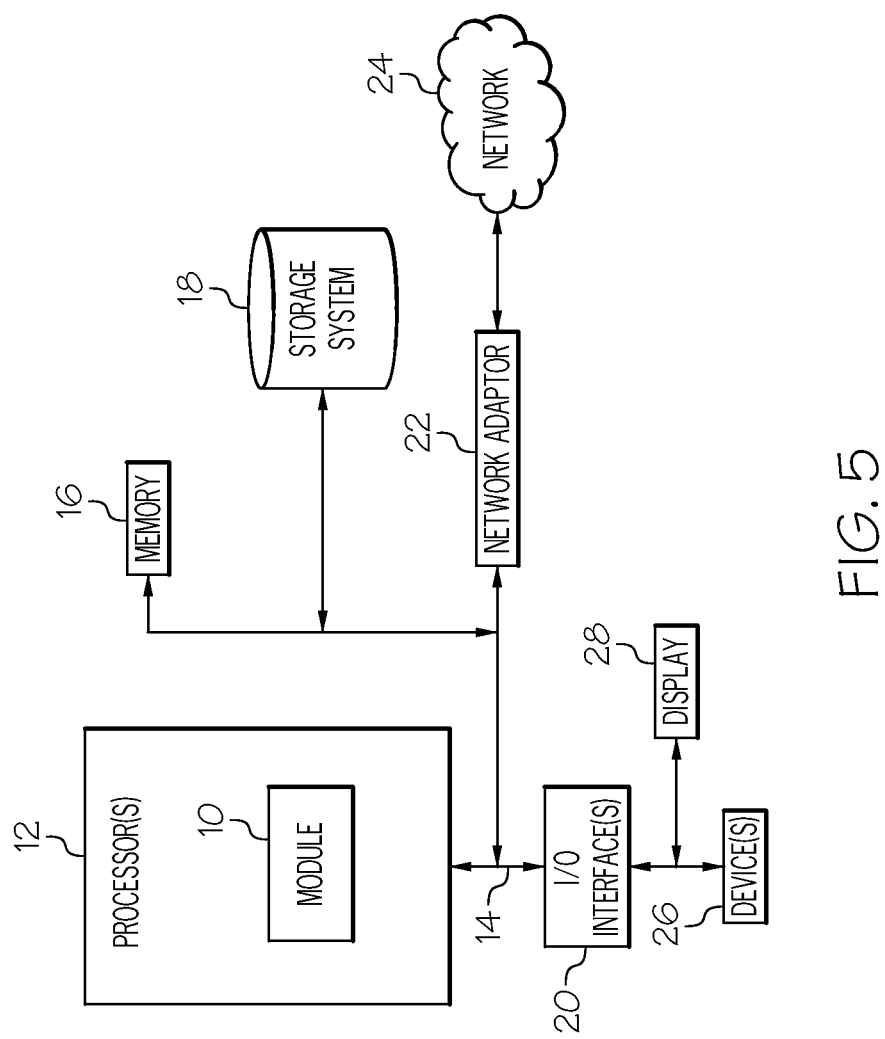
FIG. 5 illustrates a schematic of an example computer or processing system that may implement a reviewer feedback presentation system in one embodiment of the present disclosure.

FIG. 5 illustrates a schematic of an example computer or processing system that may implement a reviewer feedback presentation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of presenting a reviewer feedback of a document, comprising:

linking a user of a word processing editor to a social network application;

retrieving a plurality of feedback on a document edited on the word processing editor, each feedback having an associated reviewer who provided the feedback;

for each of the plurality of feedback,
automatically connecting the word processing editor to the social network application via an application program interface (API), which allows applications to connect and communicate data, and obtaining via the API social data associated with the reviewer who has reviewed the document and provided the feedback;

identifying, by the word processing editor executing on a processor, a plurality of characteristics associated with the feedback, at least some of the characteristics identified based on the social data, the characteristics comprising at least the associated reviewer's position in an organization hierarchy, the reviewer's expertise, frequency of the feedback, impact of the feedback, and usefulness of the feedback, the impact of the feedback comprising at least an amount of change in the document required by the feedback determined by the word processing editor executing a natural language processing and determining a nature of the feedback, the word processing editor in identifying the plurality of characteristics further executing the natural language processing and dictionary and grammar-based rules, and determining whether the feedback is related to spelling and grammar, whether the feedback is related to a concept described in the document;

prioritizing, by the word processing editor, the plurality of feedback based on the plurality of characteristics including at least the associated reviewer's level in an organization hierarchy and a number of reviewers commenting on a section of the document; and presenting, by the word processing editor on a user interface of an editing user of the document, a list of prioritized feedback based on the prioritizing, and presenting, by the word processing editor on the user interface a hyperlink to online material pointed to by the feedback, wherein a user's preference indicated by the list of prioritized feedback persists across a plurality of documents, wherein responsive to the document being opened in the word processing editor, the word processing editor displaying the list of prioritized feedback in a user interface window panel and displaying a document window pane of the user interface showing a section of the document that the list of prioritized feedback applies to, each of the prioritized list of feedback on the user interface window panel displayed as a selectable item, and responsive to selecting an item from the prioritized list of feedback on the user interface window panel, the word processing editor further expanding the display of the item from the prioritized list of feedback on the user interface window panel to include a reason for prioritizing the item.

2. The method of claim 1, wherein the plurality of characteristics have associated weighted values representing priorities of said characteristics, wherein the plurality of feedback is prioritized based on the associated weighted values.

3. The method of claim 2, further comprising:
allowing a user to interactively select one or more of the characteristics and modify one or more weighted values respectively associated with the selected one or more characteristics.

4. The method of claim 3, further comprising:
updating the list of prioritized feedback based on the modified one or more weighted values respectively associated with the selected one or more characteristics.

5. The method of claim 1, further comprising:
allowing a user to enter the usefulness of the feedback.

6. The method of claim 1, further comprising:
presenting a link to online material specified in one or more of the feedback.

* * * * *